United States Patent
Maeda et al.

(10) Patent No.: US 8,644,456 B2
(45) Date of Patent: Feb. 4, 2014

(54) IMPROPER CONNECTION DETERMINATION METHOD AND COMMUNICATION APPARATUS

(75) Inventors: Jyunji Maeda, Ichinomiya (JP); Hiroshi Ono, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 981 days.

(21) Appl. No.: 12/731,248

(22) Filed: Mar. 25, 2010

(65) Prior Publication Data

US 2010/0303212 A1 Dec. 2, 2010

(30) Foreign Application Priority Data

May 29, 2009 (JP) .................................. 2009-130438

(51) Int. Cl.
H04M 1/24 (2006.01)
H01H 85/041 (2006.01)
H04B 7/08 (2006.01)
H04L 29/14 (2006.01)

(52) U.S. Cl.
USPC ........... 379/27.01; 361/104; 379/1.04; 379/3; 379/22.07; 379/29.04; 379/111; 455/277.1; 455/402; 714/25

(58) Field of Classification Search
USPC ............... 361/104; 379/1.04, 3, 27.01, 27.06, 379/27.08, 387.01, 395, 413.04, 22.07, 379/29.04, 111, 144.05; 455/277.1, 402; 714/25
See application file for complete search history.

(56) References Cited

U.S. PATENT DOCUMENTS

| 4,066,843 | A | * | 1/1978 | Waks et al. .................... 379/111 |
| 4,595,796 | A | * | 6/1986 | Robra et al. ................ 379/29.04 |
| 4,614,844 | A | * | 9/1986 | Leeper ....................... 379/27.08 |
| 4,710,949 | A | * | 12/1987 | Ahuja ........................ 379/27.06 |
| 4,852,145 | A | * | 7/1989 | Bevers et al. .............. 379/27.01 |
| 5,066,939 | A | * | 11/1991 | Mansfield, Jr. ............... 455/402 |
| 5,726,851 | A | * | 3/1998 | Knapp .......................... 361/104 |
| 5,764,725 | A | * | 6/1998 | Martin et al. .............. 379/22.07 |
| 6,028,928 | A | * | 2/2000 | Mullaney et al. ........ 379/413.04 |
| 6,144,722 | A | * | 11/2000 | Anderson et al. .......... 379/27.01 |
| 6,332,072 | B1 | * | 12/2001 | Johnson et al. ............ 455/277.1 |
| 6,912,671 | B2 | * | 6/2005 | Christensen et al. ........... 714/25 |
| 7,254,217 | B2 | * | 8/2007 | Rude et al. ........................ 379/3 |
| 2003/0103609 | A1 | * | 6/2003 | Ku ........................... 379/144.05 |
| 2003/0202652 | A1 | * | 10/2003 | Vasquez et al. .......... 379/387.01 |
| 2006/0067513 | A1 | * | 3/2006 | Maytal et al. ................. 379/395 |
| 2009/0168972 | A1 | * | 7/2009 | Cioffi et al. .................. 379/1.04 |
| 2010/0303212 | A1 | * | 12/2010 | Maeda et al. .............. 379/27.01 |

FOREIGN PATENT DOCUMENTS

| JP | 08-046719 | 2/1996 |
| JP | 2000-151868 | 5/2000 |

* cited by examiner

Primary Examiner — Gerald Gauthier
(74) Attorney, Agent, or Firm — Banner & Witcoff, Ltd.

(57) ABSTRACT

An improper connection determination method includes a closed circuit forming step, a current detection step and a determination step. In the closed circuit forming step, a closed circuit from one of at least two contacts in a telephone connection terminal of a communication apparatus to another one of the at least two contacts in the telephone connection terminal is formed. In the current detection step, a current flowing in the closed circuit, when the closed circuit is formed in the closed circuit forming step, is detected. In the determination step, it is determined that the telephone line is improperly connected to the telephone connection terminal when the current is detected in the current detection step.

10 Claims, 3 Drawing Sheets

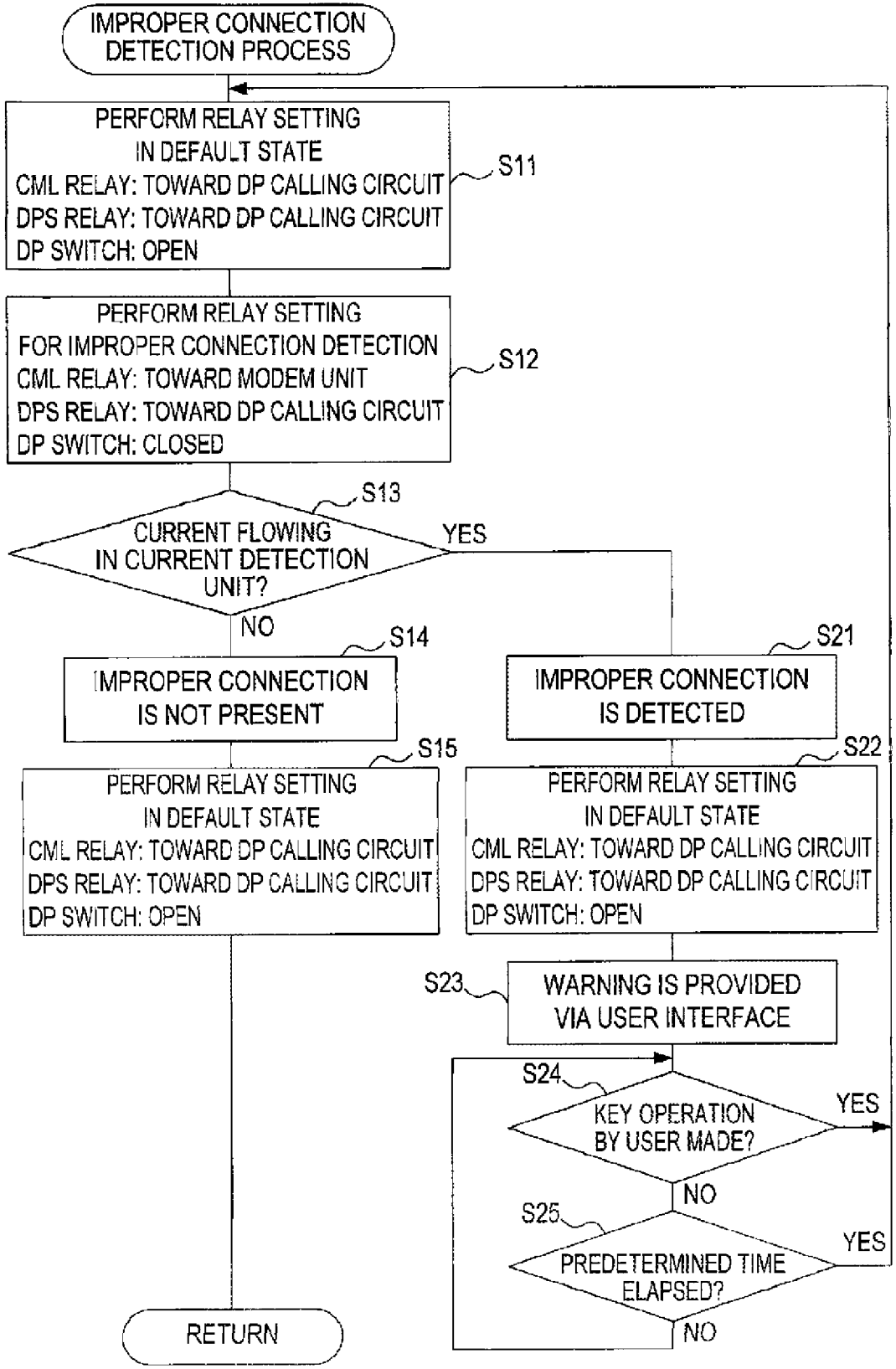

IMPROPER CONNECTION DETERMINATION METHOD AND COMMUNICATION APPARATUS

CROSS-REFERENCE TO RELATED APPLICATIONS

This application claims the benefit of Japanese Patent Application No. 2009-130438 filed May 29, 2009 in the Japan Patent Office, the disclosure of which is incorporated herein by reference.

BACKGROUND

This invention relates to a communication apparatus performing communication via a telephone line, and particularly relates to a communication apparatus including a line connection terminal having at least two contacts to which a telephone line is connected, and a telephone connection terminal having at least two contacts to which a telephone set is connected.

In an example of conventional communication apparatuses, a CML (Connect Modem to Line) relay and a loop current detection circuit are provided. The CML relay switchably connects a line connection terminal to one of a telephone connection terminal and a modem unit. The loop current detection circuit detects a current flowing from the CML relay to the modem unit when the line connection terminal is connected to the modem unit via the CML relay. According to this example, it may be determined that a telephone set is improperly connected to the line connection terminal when the loop current detection circuit detects no current.

SUMMARY

According to the above described example, however, although it is possible to directly determine that the telephone set is improperly connected to the line connection terminal, it is not possible to directly determine that the telephone line is improperly connected to the telephone connection terminal.

In one aspect of the present invention, it is desirable to provide a technique capable of directly determining that the telephone line is improperly connected to a telephone connection terminal in a communication apparatus.

An improper connection determination method in a first aspect of the present invention is a method for determining improper connection of a telephone line to a communication apparatus including a line connection terminal having at least two contacts to which the telephone line is connected, and a telephone connection terminal having at least two contacts to which a telephone set is connected.

More specifically, the improper connection determination method includes a closed circuit forming step, a current detection step and a determination step. In the closed circuit forming step, a closed circuit from one of the at least two contacts in the telephone connection terminal to another one of the at least two contacts in the telephone connection terminal is formed. In the current detection step, a current flowing in the closed circuit, when the closed circuit is formed in the closed circuit forming step, is detected. In the determination step, it is determined that the telephone line is improperly connected to the telephone connection terminal when the current is detected in the current detection step.

If the telephone line is connected to the telephone connection terminal, a current flows from one contact of the telephone connection terminal to another contact thereof by a voltage applied from the telephone line when a closed circuit is formed. It is, therefore, possible to directly determine that the telephone line is improperly connected to the telephone connection terminal according to the present improper connection determination method.

A communication apparatus in a second aspect of the present invention includes: a line connection terminal, a telephone connection terminal, a connection path connecting/disconnecting unit, an off-hook detection unit, a closed circuit opening/closing unit, a control unit and a determination unit. The line connection terminal has at least two contacts to which a telephone line is connected. The telephone connection terminal has at least two contacts to which a telephone set is connected. The connection path connecting/disconnecting unit is provided in a connection path for connecting the line connection terminal and the telephone connection terminal, and selectively connects and disconnects the connection path. The off-hook detection unit is provided in a current path between the telephone connection terminal and the connection path connecting/disconnecting unit, and detects a current flowing through the current path. The closed circuit opening/closing unit is provided in a closed circuit from one of the at least two contacts in the telephone connection terminal to another one of the at least two contacts in the telephone connection terminal through the off-hook detection unit, and selectively opens and closes the closed circuit. The control unit performs a control to cause the connection path connecting/disconnecting unit to disconnect the connection path as well as to cause the closed circuit opening/closing unit to close the closed circuit. The determination unit determines, if the off-hook detection unit detects the current when the control unit performs the control, that the telephone line is improperly connected to the telephone connection terminal.

According to the communication apparatus configured as described above, if the telephone line is connected to the telephone connection terminal, a current flows from one contact of the telephone connection terminal to another contact thereof by a voltage applied from the telephone line when a closed circuit is formed. It is, therefore, possible to directly determine that the telephone line is improperly connected to the telephone connection terminal by detecting the current.

BRIEF DESCRIPTION OF THE DRAWINGS

The present invention will now be described below, by way of example with reference to the accompanying drawings, in which:

FIG. 3 is a flowchart showing in detail an improper connection detection process in the control.

DETAILED DESCRIPTION OF THE PREFERRED EMBODIMENTS

[Circuit Configuration of Multifunction Device]

Figure 1:
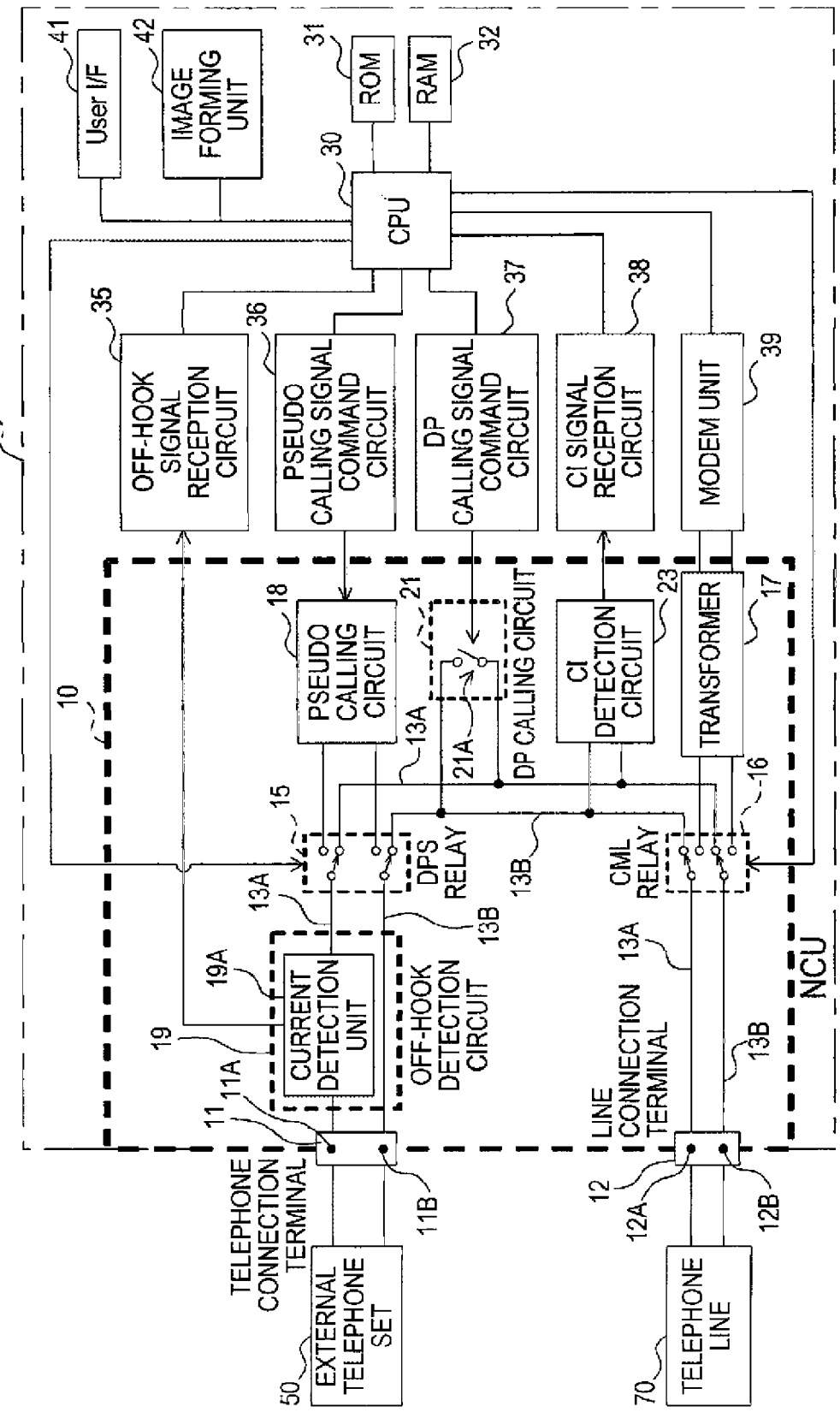
FIG. 1 is a block diagram showing a configuration of a multifunction device to which the present invention is applied.

As shown in FIG. 1, a multifunction device 1 in the present embodiment includes an NCU (Network Control Unit) 10 and a CPU 30 that controls the NCU 10.

A ROM 31 and a RAM 32 are connected to the CPU 30. The CPU 30 controls the NCU 10 in accordance with a program stored in the ROM 31 via an off-hook signal reception circuit 35, a pseudo calling signal command circuit 36, a dial pulse (DP) calling signal command circuit 37, a call indicator (CI) signal reception circuit 38 and a modem unit 39. These circuits 35 to 38 respectively include photocouplers or the like for electrical insulation between the CPU 30 and the NCU 10. The modem unit 39 is of a known type which analyzes and digitalizes modulated communication data (image data). Further, a user interface (User I/F) 41 and an image forming unit 42 are connected to the CPU 30. The user interface 41 is provided on a surface of a housing (not shown) of the multifunction device 1. The image forming unit 42 forms an image on a sheet based on image data received via the modem unit 39. In addition, a DPS relay 15 and a CML relay 16 are connected to the CPU 30, which controls the DPS relay 15 and the CML relay 16.

The NCU 10 includes a telephone connection terminal 11 to which an external telephone set 50 is connectable, and a line connection terminal 12 to which a telephone line 70 is connectable. Both of the telephone connection terminal 11 and the line connection terminal 12 are constituted as modular jacks having the same shape and exposed to the outside of the multifunction device 1. More specifically, the telephone connection terminal 11 has two contacts 11A and 11B, while the line connection terminal 12 has two contacts 12A and 12B. The above mentioned DPS relay 15 and the above mentioned CML relay 16 are provided both in a current path 13A which connects the contact 11A and the contact 12A and in a current path 13B which connects the contact 11B and the contact 12B.

When the DPS relay 15 and the CML relay 16 are switched to respective contact positions as shown in FIG. 1, the telephone connection terminal 11 and the line connection terminal 12 are connected via the current paths 13A and 13B, and thereby the external telephone set 50 and the telephone line 70 are connected to each other. The CML relay 16, which is disposed on a side of the line connection terminal 12 in the current paths 13A and 13B, can disconnect both of the current paths 13A and 13B, thereby connecting the line connection terminal 12 to a transformer 17. The transformer 17 transmits communication data inputted from the telephone line 70 to the modem unit 39 while maintaining the telephone line 70 and the modem unit 39 electrically insulated.

The DPS relay 15, which is disposed on a side of the telephone connection terminal 11 in the current paths 13A and 13B, can disconnect both of the current paths 13A and 13B, thereby connecting the telephone connection terminal 11 to a pseudo calling circuit 18. The pseudo calling circuit 18 is a well-known circuit that outputs a pseudo calling signal, which replaces a calling signal inputted via the telephone line 70, in accordance with a command from the pseudo calling signal command circuit 36. Specifically, when the DPS relay 15 is switched toward the pseudo calling circuit 18, it is possible to output a pseudo calling signal from the pseudo calling circuit 18 to the external telephone set 50 in accordance with a command from the pseudo calling signal command circuit 36, and thus possible to cause the external telephone set 50 not to ring even when an incoming call is received.

Also, in the current path 13A between the contact 11A of the telephone connection terminal 11 and the DPS relay 15, there is provided an off-hook detection circuit 19 having a current detection unit 19A including a photocoupler. A detection signal outputted from the off-hook detection circuit 19 is inputted to the CPU 30 via the off-hook signal reception circuit 35.

Further, in the current paths 13A and 13B between the DPS relay 15 and the CML relay 16, a DP calling circuit 21 and a CI detection circuit 23 are connected in parallel. The DP calling circuit 21 is a known circuit that shunts the current paths 13A and 13B by the DP switch 21A in accordance with a command from the DP calling signal command circuit 37 thereby to output a DP calling signal to the telephone line 70. The DP switch 21A is constituted, for example, by a phototransister that constitutes, along with a light emitting diode which is driven by the DP calling signal command circuit 37, a photocoupler. The CI detection circuit 23 is a known circuit that detects a CI signal inputted from the telephone line 70 and indicating an incoming call, and then inputs the detected CI signal to the CI signal reception circuit 38.

[Control in Multifunction Device]

Next, control executed by the CPU 30 in the multifunction device 1 in accordance with a program stored in the ROM 31 will be described with reference to the flowcharts in FIGS. 2 and 3. A process shown in FIG. 2 is started when power is turned on in the multifunction device 1.

Figure 2:
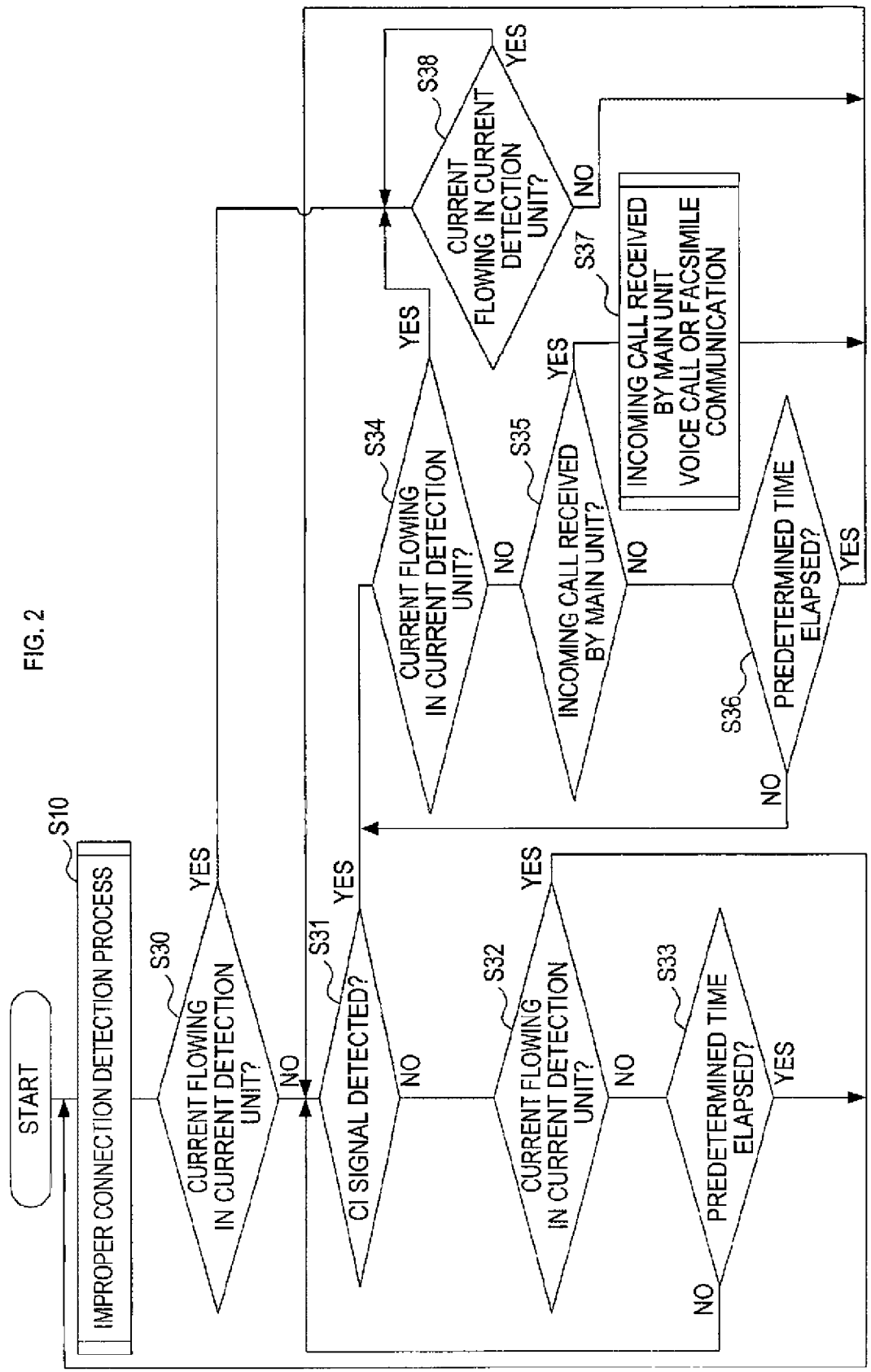
FIG. 2 is a flowchart showing a control performed in the multifunction device.

As shown in FIG. 2, when the process is started, an improper connection detection process is first performed in S10 (S represents "Step", and hereinafter the same).

As shown in FIG. 3, in the improper connection detection process, a relay setting for a default state (line opened) is first performed in S11. Specifically, the CML relay 16 is switched toward the DP calling circuit 21, the DPS relay 15 is also switched toward the DP calling circuit 21, and the DP switch 21A is made open. At the same time, determination of line type is performed by a separate routine (not shown).

In subsequent S12, a relay setting for improper connection detection is performed. Specifically, the CML relay 16 is switched toward the modem unit 39, the DPS relay 15 is maintained toward the DP calling circuit 21, and the DP switch 21A is made closed. This process results in formation of a closed circuit (i.e., the circuit is closed) from the contact 11A of the telephone connection terminal 11 sequentially through the off-hook detection circuit 19, the DPS relay 15 and the DP calling circuit 21 via the current path 13A, and then via the current path 13B to the contact 11B of the telephone connection terminal 11. The closed circuit is electrically disconnected to the line connection terminal 12 since the CML relay 16 is switched toward the modem unit 39.

Accordingly, when the external telephone set 50 is normally connected to the telephone connection terminal 11, current does not flow through the above-mentioned closed circuit, while when the telephone line 70 is improperly connected to the telephone connection terminal 11, current flows in the closed circuit by a predetermined voltage (for example, 48 VDC) applied from the telephone line 70. Then, in S13, it is determined whether or not current is flowing in the current detection unit 19A and thus in the closed circuit by monitoring a detection signal of the off-hook detection circuit 19.

When the current is not flowing (S13: NO), it is determined in S14 that improper connection is not present, and subsequently relay setting for the default state is performed in S15 in a same manner as in S11. Then, the present process proceeds to S30 shown in FIG. 2.

On the other hand, when the current is flowing (S13: YES) in the closed circuit, it is determined (detected) in S21 that improper connection is present, and subsequently relay setting for the default state is performed in S22 in the same manner as in S11. Then, a warning is provided via the user interface 41 in S23. In subsequent S24, it is determined whether or not a key operation by a user has been made. When it is determined that a key operation has not been made (S24: NO), it is determined in S25 whether or not a predetermined time has elapsed since the warning is provided in S23. When it is determined that the predetermined time has not elapsed (S25: NO), the present process returns to S24, and remains in a waiting state by performing a loop process of S24 and S25 until a key operation by the user is made or the predetermined time has elapsed. When a key operation by the user is made (S24: YES) or the predetermined time has elapsed (S25: YES), the present process returns to S11.

Accordingly, even when the improper connection is detected (S21) and the warning is provided via the user interface 41 (S23), if the user corrects the improper connection in response to the warning and then makes some key operation (S24: YES), or the predetermined time has elapsed (S25: YES), determination on improper connection (S11 to S13) is performed again. When the improper connection has been corrected (S13: YES), the present process proceeds to S30 in FIG. 2 through above described S14 and S15.

Returning to FIG. 2, it is determined in S30 whether or not current is flowing in the current detection unit 19A by monitoring a detection signal of the off-hook detection circuit 19. Since the relay setting for the default state has currently been performed (S15), current flows in the current detection unit 19A only when both the external telephone set 50 and the telephone line 70 are normally connected and also the external telephone set 50 is in an off-hook state. The external telephone set 50 is usually not in the off-hook state immediately after power is turned on (S30: NO), the present process proceeds to S31.

In S31, it is determined via the CI signal reception circuit 38 whether or not a CI signal is detected by the CI detection circuit 23. When a CI signal is not detected (S31: NO), it is determined in S 32 in a same manner as in S30 whether or not current is flowing in the current detection unit 19A of the off-hook detection circuit 19. When current is not flowing (S32: NO), it is then determined in S33 whether or not a predetermined time has elapsed since the processing in S30. When the predetermined time has not elapsed (S33: NO), the present process returns to S31. As described above, once power is turned on, the present process usually proceeds through S10 and S30 to a loop process of S31 to S33 and remains in a waiting state.

When an incoming call is received during the waiting state by the processings of S31 to S33 and a CI signal is detected (S31: YES), the present process proceeds to S34, in which it is determined whether or not current is flowing in the current detection unit 19A of the off-hook detection circuit 19. When current is not flowing (S34: NO), it is determined in S35 whether or not the incoming call is received by a main unit of the multifunction device 1. When the main unit has not received the incoming call (S35: NO), it is then determined in S36 whether or not a predetermined time has elapsed since it is determined in S31 that a CI signal is detected. When the predetermined time has not elapsed (S36: NO), the present process returns to S34. Typically, when a CI signal is detected (S31: YES), the external telephone set 50 is brought into the off-hook state and current flows in the current detection unit 19A of the off-hook detection circuit 19 (S34: YES), or the main unit receives the incoming call (S35: YES) before the predetermined time has elapsed (S36: NO) during the calling by the processings in S34 to S36.

When the main unit receives the incoming call (S35: YES), the present process proceeds to S37 and a known main unit's call reception processing is performed. The known main unit's call reception processing here includes a voice call with a handset (not shown) provided to the main unit of the multifunction device 1, or facsimile communication via the modem unit 39. Subsequently, the present process returns to the waiting state by the processings in S31 to S33. While the main unit's call reception processing in S37 is performed, the CML relay 16 is switched toward the modem unit 39.

When current flows in the current detection unit 19A of the off-hook detection circuit 19 (S34: YES) during the calling by the processings in S34 to S36, the present process proceeds to S38 and remains in a waiting state (S38: YES) until the current stops flowing. Specifically, in this case, it is determined that an external voice call is ongoing with the external telephone set 50 in the off-hook state, and the waiting state continues until the external telephone set 50 is brought into an on-hook state and thereby the current stops flowing.

When the voice call ends and the external telephone set 50 is brought into the on-hook state, and thereby the current stops flowing in the current detection unit 19A of the off-hook detection circuit 19 (S38: NO), the present process returns to the waiting state by the processings in S31 to S33. When the predetermined time has elapsed during the calling by the processings in S34 to S36 (S36: YES), the present process also returns to the waiting state by the processings in S31 to S33.

When current flows in the current detection unit 19A of the off-hook detection circuit 19 (S32: YES), or the predetermined time has elapsed (S33: YES) in the waiting state by the processings in S31 to S33, the present process returns to S10, and the improper connection detection process is performed again. Such a current flow in the current detection unit 19A of the off-hook detection circuit 19 in the waiting state by the processings in S31 to S33 occurs when the telephone line 70 is improperly connected to the telephone connection terminal 11 after power is turned on or when the external telephone set 50 is brought into the off-hook state to start calling. When the external telephone set 50 is brought into the off-hook state, the off-hook state continues even after the improper connection detection process (S10) is terminated, and current continues flowing in the current detection unit 19A. Accordingly, it is determined in S30 that current is flowing in the current detection unit 19A, and the present process proceeds to S38. Thus, the present process remains in the waiting state in S38 until the voice call ends and the external telephone set 50 is brought into the on-hook state also in the case of calling from the external telephone set 50.

When a setting is performed after power is turned on such that the external telephone set 50 does not ring even when an incoming call is received in the waiting state by the processings of S31 to S33, the DPS relay 15 is switched toward the pseudo calling circuit 18 at the time. If the present process retunes to S10 afterward, DPS relay 15 is switched toward the pseudo calling circuit 18 again in S15.

[Effects of Embodiment and Modifications]

According to the multifunction device 1 of the present embodiment, as described above, it is possible to perform the improper connection detection process (S10) when power is turned on and each time a predetermined time has elapsed (S33: YES) thereby to directly determine whether or not the telephone line 70 is improperly connected to the telephone connection terminal 11. The improper connection detection process (S10) is also performed when current flows in the current detection unit 19A (S32: YES) in the waiting state by the processings of S31 to S33. Accordingly, if the telephone line 70 is improperly connected to the telephone connection terminal 11 after power is turned on, the improper connection may be immediately detected. Specifically, if the telephone line 70 is improperly connected to the telephone connection terminal 11 after power is turned on, the closed circuit is formed when the external telephone set 50 improperly connected to the line connection terminal 12 is brought into the off-hook state or when the DPS relay 15 is switched to the pseudo calling circuit 18, current flows in the current detection unit 19A (S32: YES), and thus the improper connection detection process (S10) is performed.

Since the improper connection detection process (S10) is performed using the existing off-hook detection circuit 19 and DP calling circuit 21, it is possible to detect an improper connection of the telephone line 70 to the telephone connection terminal 11 without complicating the configuration of the multifunction device 1.

Further, in the improper connection detection process (S10), the DPS relay 15 is switched to the DP calling circuit 21, and thereby the pseudo calling circuit 18 is electrically disconnected from the telephone connection terminal 11. Accordingly, even if the above-described improper connection is made, it is possible to inhibit breakage of the pseudo calling circuit 18 which may be caused by voltage being applied to the pseudo calling circuit 18 from the telephone line 70.

Also, in the improper connection detection process (S10), when improper connection of the telephone line 70 to the telephone connection terminal 11 is detected, a warning is provided via the user interface 41. Accordingly, the user of the multifunction device 1 may immediately recognize improper connection of the telephone line 70.

In the present embodiment, the line connection terminal 12 is an example of the line connection terminal of the present invention, the telephone connection terminal 11 is an example of the telephone connection terminal of the present invention, S 12 in the improper connection detection process is an example of a closed circuit forming step of the present invention, S13 in the improper connection detection process is an example of a current detection step of the present invention, S 21 in the improper connection detection process is an example of determination step of the present invention, and S 23 in the improper connection detection process is an example of a warning step of the present invention.

In the present embodiment, the CML relay 16 is an example of a connection path connecting/disconnecting unit of the present invention, the off-hook detection circuit 19 is an example of an off-hook detection unit of the present invention, the DP calling circuit 21 is an example of a closed circuit opening/closing unit and a dial pulse calling signal output circuit of the present invention, and the CPU 30 is an example of a control unit and a determination unit of the present invention.

In the present embodiment, the pseudo calling circuit 18 is an example of a pseudo calling signal output unit of the present invention, the DPS relay 15 is an example of a connection switching unit of the present invention, and the CPU 30 and the user interface 41 are an example of a warning unit of the present invention.

It should be noted that the present invention is not limited to the above-described embodiment, but can be practiced in various forms without departing from the gist of the present invention.

For example, the closed circuit opening/closing unit, such as the DP calling circuit 21, may be configured to merely bypass, with a low impedance, the current path between the off-hook detection unit and the connection path connecting/disconnecting unit instead of completely shunting the current path. In this case, a current flow large enough to be detected by the off-hook detection unit is necessary. As the closed circuit opening/closing unit, an existing component other than the DP calling circuit be used, or a separate circuit (a switch or the like) may be provided instead of using an existing component. Also, each of the telephone connection terminal and the line connection terminal may have three or more contacts. Furthermore, the present invention may be applied to a variety of communication apparatuses, such as a modem unit for connecting a personal computer to a telephone line, other than a multifunction device and a facsimile apparatus.

What is claimed is:

1. An improper connection determination method for determining improper connection of a telephone line to a communication apparatus including a line connection terminal having at least two contacts to which the telephone line is connected, and a telephone connection terminal having at least two contacts to which a telephone set is connected, the method comprising:
   a closed circuit forming step of forming a closed circuit from one of the at least two contacts in the telephone connection terminal to another one of the at least two contacts in the telephone connection terminal;
   a current detection step of detecting a current flowing in the closed circuit when the closed circuit is formed in the closed circuit forming step; and
   a determination step of determining that the telephone line is improperly connected to the telephone connection terminal when the current is detected in the current detection step.

2. The improper connection determination method as set forth in claim 1, further comprising a warning step of providing a warning when it is determined in the determination step that the telephone line is improperly connected to the telephone connection terminal.

3. A communication apparatus comprising:
   a line connection terminal having at least two contacts to which a telephone line is connected;
   a telephone connection terminal having at least two contacts to which a telephone set is connected;
   a connection path connecting/disconnecting unit that is provided in a connection path for connecting the line connection terminal and the telephone connection terminal, and selectively connects and disconnects the connection path;
   an off-hook detection unit that is provided in a current path between the telephone connection terminal and the connection path connecting/disconnecting unit, and detects a current flowing through the current path;
   a closed circuit opening/closing unit that is provided in a closed circuit from one of the at least two contacts in the telephone connection terminal to another one of the at least two contacts in the telephone connection terminal through the off-hook detection unit, and selectively opens and closes the closed circuit;
   a control unit that performs a control to cause the connection path connecting/disconnecting unit to disconnect the connection path as well as to cause the closed circuit opening/closing unit to close the closed circuit; and
   a determination unit that determines, if the off-hook detection unit detects the current when the control unit performs the control, that the telephone line is improperly connected to the telephone connection terminal.

4. The communication apparatus as set forth in claim 3, further comprising:
   a pseudo calling signal output unit that outputs a pseudo calling signal to the telephone connection terminal via the off-hook detection unit; and
   a connection switching unit that connects the off-hook detection unit and the telephone connection terminal selectively to one of the pseudo calling signal output unit and the closed circuit opening/closing unit, the connection switching unit being controllable by the control unit, wherein, when performing the control, the control unit controls the connection switching unit such that the off-hook detection unit and the telephone connection terminal are connected to the closed circuit opening/closing unit.

5. The communication apparatus as set forth in claim 3, wherein the closed circuit opening/closing unit performs another function related to communication in the communication apparatus.

6. The communication apparatus as set forth in claim 5, wherein the closed circuit opening/closing unit includes a dial pulse calling signal output circuit that outputs a dial pulse calling signal to a callee connected to the line connection terminal via the telephone line when the connection path connecting/disconnecting unit connects the connection path.

7. The communication apparatus as set forth in claim 3, wherein the control unit performs the control when power is turned on in the communication apparatus.

8. The communication apparatus as set forth in claim 3, wherein the control unit performs the control each time a predetermined time has elapsed.

9. The communication apparatus as set forth in claim 3, wherein the control unit performs the control when the off-hook detection unit detects the current.

10. The communication apparatus as set forth in claim 3, further comprising:
  a warning unit that provides a warning that the telephone line is improperly connected to the telephone connection terminal when the determination unit determines that the telephone line is improperly connected to the telephone connection terminal.

* * * * *